United States Patent [19]
de Putter

[11] 4,103,320
[45] Jul. 25, 1978

[54] THERMALLY INSULATED PIPE WITH ELECTRICALLY CONDUCTING PORTIONS FOR DISSIPATING STATIC ELECTRICITY

[75] Inventor: Warner Jan de Putter, Hardenberg, Netherlands

[73] Assignee: Wavin B. V., Zwolle, Netherlands

[21] Appl. No.: 743,658

[22] Filed: Nov. 22, 1976

[30] Foreign Application Priority Data

Nov. 21, 1975 [DE] Fed. Rep. of Germany ....... 2552349
Mar. 20, 1976 [DE] Fed. Rep. of Germany ....... 2611848
Mar. 20, 1976 [DE] Fed. Rep. of Germany ....... 2611849

[51] Int. Cl.$^2$ .................. F16L 11/12; H05F 3/02; F16L 9/14; F16L 59/14
[52] U.S. Cl. .................................. 361/215; 138/149; 174/47
[58] Field of Search ............... 174/47, 84 S; 138/149; 361/215

[56] References Cited

U.S. PATENT DOCUMENTS

| | | | |
|---|---|---|---|
| 1,618,455 | 2/1927 | Lindsay | 138/149 X |
| 2,041,911 | 5/1936 | Ericson | 138/149 X |
| 3,943,273 | 3/1976 | de Putter | 361/215 X |

*Primary Examiner*—Laramie E. Askin
*Attorney, Agent, or Firm*—Wigman & Cohen

[57] ABSTRACT

A thermally insulated pipe particularly destined for mining industries, comprising an outer and an inner pipe, whereinbetween an insulating layer is arranged, the outer pipe being made of a synthetic material. The surface of the outer pipe is provided with an outside surface layer, being electrically conductive, which layer is connected with the inner pipe in an electrically conducting manner. The insulating material inbetween the two pipes is heat resistant.

17 Claims, 5 Drawing Figures

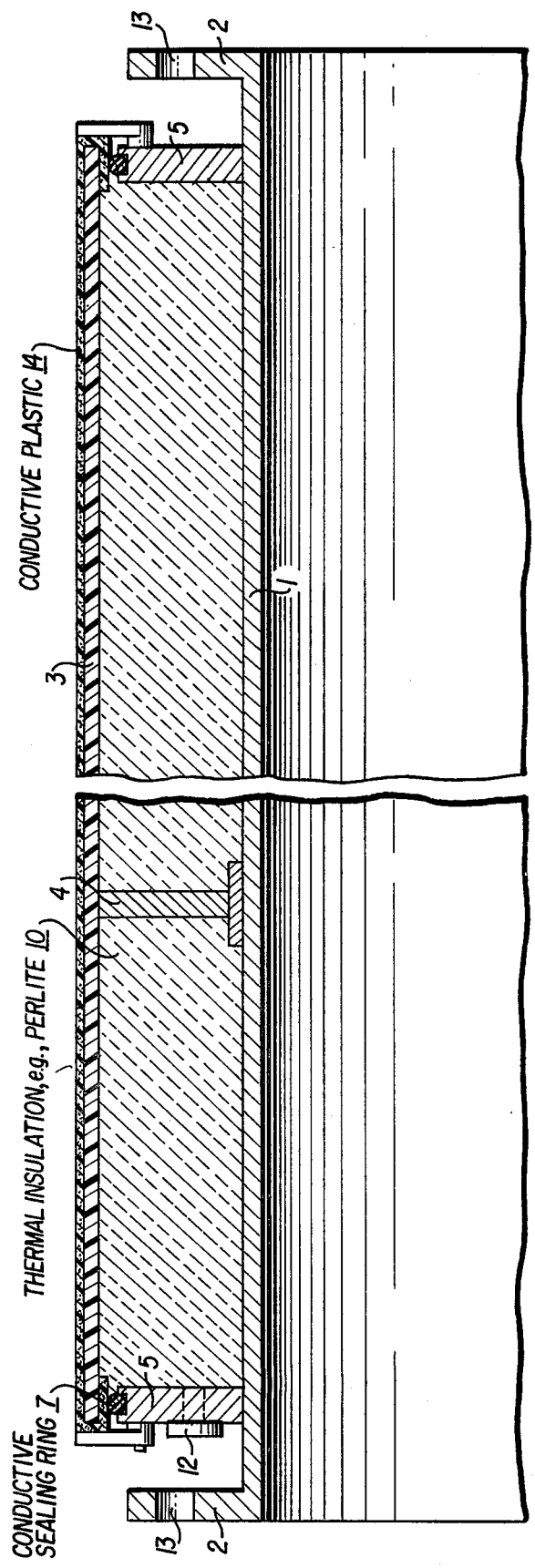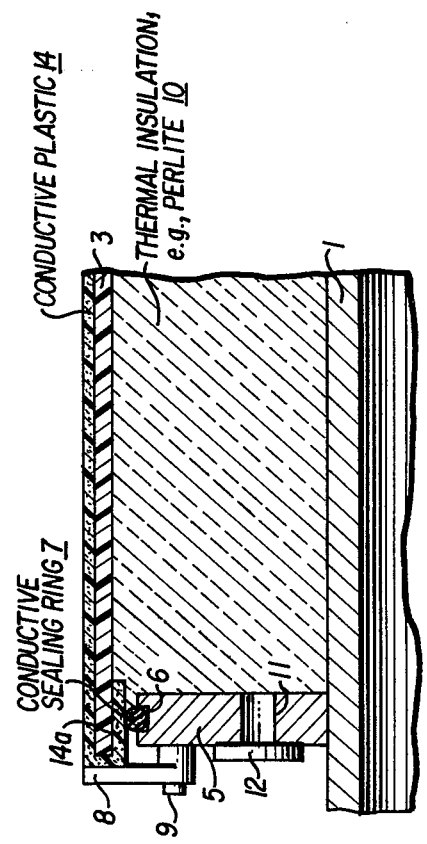
Fig. 1
Fig. 1a

THERMALLY INSULATED PIPE WITH ELECTRICALLY CONDUCTING PORTIONS FOR DISSIPATING STATIC ELECTRICITY

BACKGROUND OF THE INVENTION

This invention relates to a thermally insulated pipe, in particular a pipe for mining industries which comprises at least an outer pipe and an inner pipe, the pipes being concentrically positioned with respect to each other. Between the pipes, a thermally insulating layer is arranged, which consists preferably of heat resistant material.

Thermally insulated metal pipes of the aforementioned type are used in mining industries. When the outer pipe is, however, made of a synthetic material there is the disadvantage that the surface of the outer pipe is charged with static electric loads, which may give rise to explosions.

SUMMARY OF THE INVENTION

The invention aims at overcoming this disadvantage by providing a thermally insulated plastic outer pipe having an electrically conducting surface layer which is electrically conductively connected with the inner pipe.

When an electrically conducting surface layer is used on the outer pipe, an identical layer will be arranged on the inner pipe which consists of a synthetic material. Should the inner pipe be made of metal, however, the electrically conducting surface layer of the outer pipe can be connected directly with the inner pipe. This presents the advantage that special grounding contacts become superfluous, which facilitates operating with these kinds of pipes.

In a convenient embodiment of the present invention, a metal inner pipe has flanges spaced from the end zones which cooperate conductingly with a layer on the outside of the plastic pipe, this layer being conductive, which layer extends inside the plastic pipe at least to the points where the flanges are positioned.

It will be appreciated from the foregoing that metal pipes which are normally used in mining industries can now be used for producing the thermally conductive pipes according to the invention, since the end flanges of the metal pipes remain entirely available for mutually uniting metal pipes by means of these end flanges and bolts.

A support flange is conveniently provided with a sealing ring of conducting elastomer material arranged in a circumferential flange groove, which sealing ring cooperates both with the conductive pipe and the flange.

Thus, an excellent sealing can be obtained between a metal inner pipe and the plastic outer pipe so that the zone between both pipes which is filled with an insulating material is efficiently sealed so that no water penetration is possible, since a moistening of the insulating material would decrease its insulating properties.

The outside conductive layer on the plastic tube can be effectively extended to within said tube, so that the filling material or the electrically conductive material particles can be covered with an electrically conducting layer, which causes the present electric loads to be discharged at once from the outside of the inner pipe.

The latter presents the advantage that one is not forced to use a sealing ring of conducting material.

A sealing ring made of conducting elastomer material is preferred, since the same is cheaper in price than the operation of covering the filling particles with an electrically conductive layer.

In a very efficient embodiment, the plastic pipe is made of sealingly cooperating shells having an inside insulating layer.

BRIEF DESCRIPTION OF THE DRAWINGS

The invention will be clarified with respect to the drawings in which:

FIG. 1 shows a thermally insulated pipe in longitudinal section according to the invention;

FIG. 1a shows a detail of the sealing arrangement between the plastic outer pipe and the metal inner pipe;

DETAILED DESCRIPTION OF THE PREFERRED EMBODIMENTS

Figure 2:
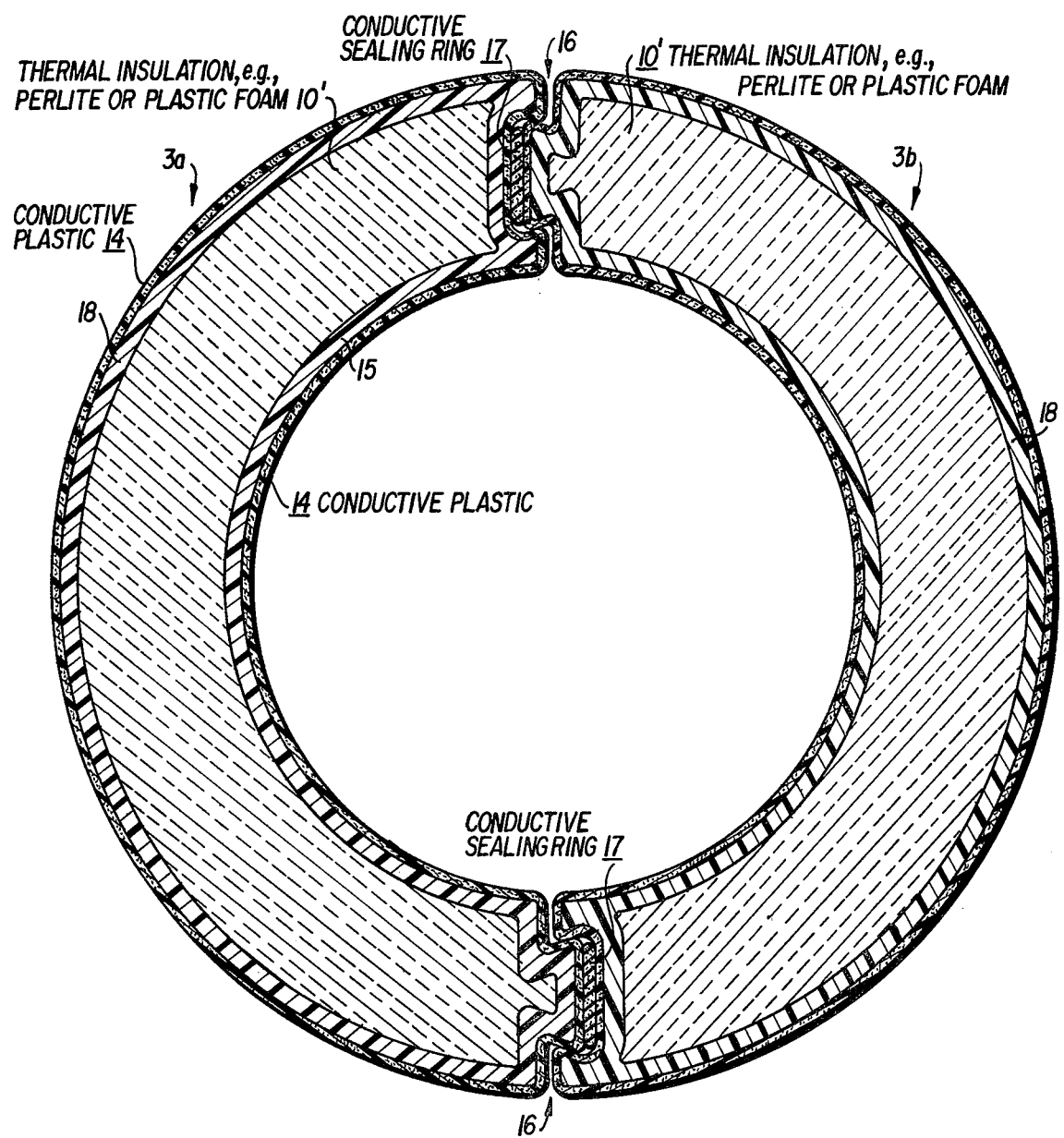
FIG. 2 shows a cross section of an insulated pipe according to the invention encircled by two half shells filled with thermally insulating material.

FIG. 1 shows a thermally insulating pipe comprising a steel inner pipe 1 having end flanges 2 furnished with bores 13 for passing bolts so as to connect two metal inner pipes 1.

The metal pipes have support flanges 5 welded thereon positioned at a small distance from the end flanges 2.

The circumference of the support flanges 5 is provided with grooves 6 in which an electrically conducting sealing ring 7 made of an elastomeric material is accommodated.

A plastic outer pipe 3, for instance, made of thermoplastic polyvinylchloride, sealingly cooperates with the sealing ring 7.

The plate 8 secured to a support flange 5 by means of bolt 9 prevents shifting of the plastic pipe over ring 7 and spacers 4 maintain the outer pipe 3 and inner pipe 1 in uniformly spaced relation along the lengths thereof.

A passage opening 11 which can be closed by means of a closing plate 12 enables filling the zone 10 between the plastic outer pipe 3 and the metal inner pipe 1. When this filling operation with, e.g., perlite, is carried out, however, the plastic outer pipe 3 cooperating at that moment with the right-hand support flange as shown in the drawing, is slid to the left-hand flange as closely as possible.

After completion of the filling operation, the plastic outer pipe is slid against the end plate 8 and, if necessary, secured there so as to avoid any shifting.

Any remaining voids in the cylindrical space 10 can be subsequently with a heat resistant, thermally insulating material through passage opening 11.

When zone 10 is completely filled, the passage opening 11 is closed by means of a closing plate 12.

An electrically conducting layer 14 is disposed on the outside of the plastic pipe 3, so as to produce an electric conduction of static loads on said outside. The layer 14 extends to within the inside of the plastic pipe as a layer 14a, which, if desired, can cover the entire inside surface of the plastic pipe 3.

Owing to the presence of the electrically conducting sealing ring 7 and the said layer 14a on the inside of the plastic pipe, any electrostatic load with which the outside of the plastic pipe is charged will be discharged at once.

In such a pipe as described above, outside grounding contacts are, as a matter of course, superfluous.

The insulating material particles which fill the circular zone 10 may be provided with an electrically conducting surface layer, which ensures a direct contact between the inner metal pipe 1 and the inside of the plastic pipe 3 which is now covered with the conducting layer 14a. This layer then extends beyond the support flanges 5.

A very suitable electrically conducting surface layer 14, 14a on or in the inside of plastic pipe 3 constitutes a thermosetting resin adherein to a thermoplast and comprising soot or carbon particles for the electric conduction. Preferably a modified epoxy resin with soot particles is used (for instance Finch 453-1-1 of Finch and Chemical Division of BOSTIK GmbH, Oberursel Ts).

The polyvinylchloride pipes are provided with this resin by means of an immersion or a spraying operation.

The conductive sealing ring is, for instance, made of rubber, comprising at least 10%, but preferably 20% soot particles.

FIG. 2 shows another embodiment of a thermally insulated pipe according to the present invention, the plastic pipe consisting of two half shells 3a and 3b secured to each other by means of a connection 16 and sealing ring 17, their connection being liquid tight.

Each shell 3a or 3b has a plastic outer wall 18 and a plastic inner wall 15, the intermediate zone 10' being filled with a heat insulating material, as for example perlite. It has been found that, in particular cases, a foam plastic filling can also be used in this zone 10'.

The outside of outer wall 18 is provided with an electrically conducting layer 14 for producing an effective electrical conduction. This layer 14 extends at the end zones of the shells on the inside of the inner wall 15 such that a direct electrically conductive connection is created between this layer inside wall 15 and the outside of the metal pipe 1.

Although the embodiment of FIG. 1 comprises an inner metal pipe 1, a plastic inner pipe can be used as well; this inner pipe is then provided with an electrically conducting surface layer. In this embodiment, the conductive connection between the outer-and inner pipe can be produced by means of the insulating material particles provided with an electrically conducting surface layer, which particles cooperate with the inside layer 14a of the plastic pipe 3 and with a conducting outside layer on the plastic inner pipe.

If this conducting outside layer on the plastic inner pipe is extended at least partially on the inside of the plastic inner pipe, static electric loads can be discharged by means of a liquid which is conveyed through the inner pipe. In this case too, any additional grounding contacts on the outside of the insulated pipe are superfluous.

By the immersion of a plastic inner pipe 1 with the flanges 5 into a resin bath with soot particles, very good electrical connections are produced, since both the inner pipe 1 and the support flange 5 are provided with a conducting layer.

Figure 3:
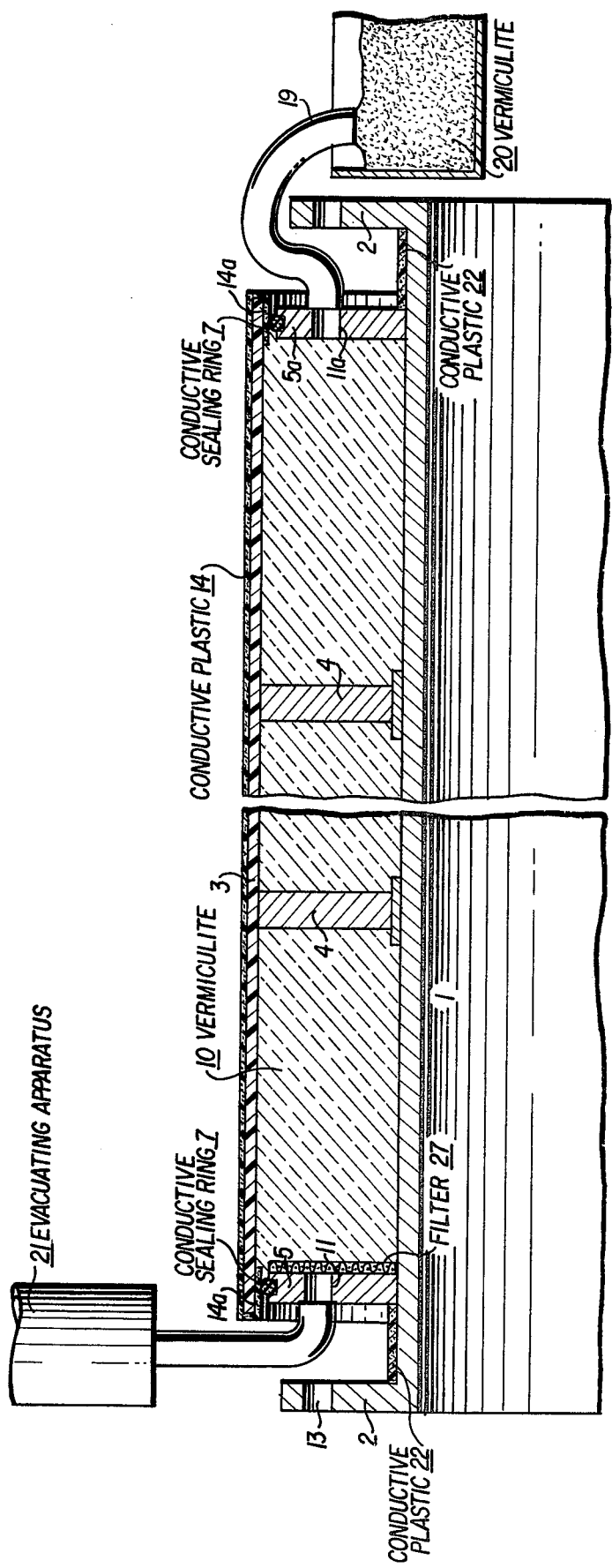
FIG. 3 shows a pipe according to the invention having openings at both ends which can be filled with insulating material.

FIG. 3 shows an embodiment for filling the zone between the inner metal pipe part 1 and an outer polyvinylchloride pipe 3 by sliding an outer pipe 3 over the circumference of support flanges 5 and 5a. This filling operation is carried out by means of a filling material which is thermally insulating, heat resistant and highly pulverized, in particular, vermiculite. This intermediate zone can, however, also be filled with other suitable pulverized insulating material.

Prior to the filling operation, opening 11 in the support flange 5 is connected to evacuating apparatus 21 on the one end, while opening 11a in the support flange 5a on the other end is connected to a container 20 containing vermiculite, by means of a hose 19, causing the vermiculite to enter the evacuated zone and filling the zone.

So as to prevent the filling material to be discharged by the evacuating apparatus 21 through the opening 11, the latter opening is covered by a layer 27 made of asbestos, a fibrous layer, a woven layer or another filter material.

When the filling operation is terminated, the two openings 11 and 11a are closed by means of closing taps 12 and 12a, whereafter the pipe can be put into operation, for instance, in a mine shaft.

Figure 4:
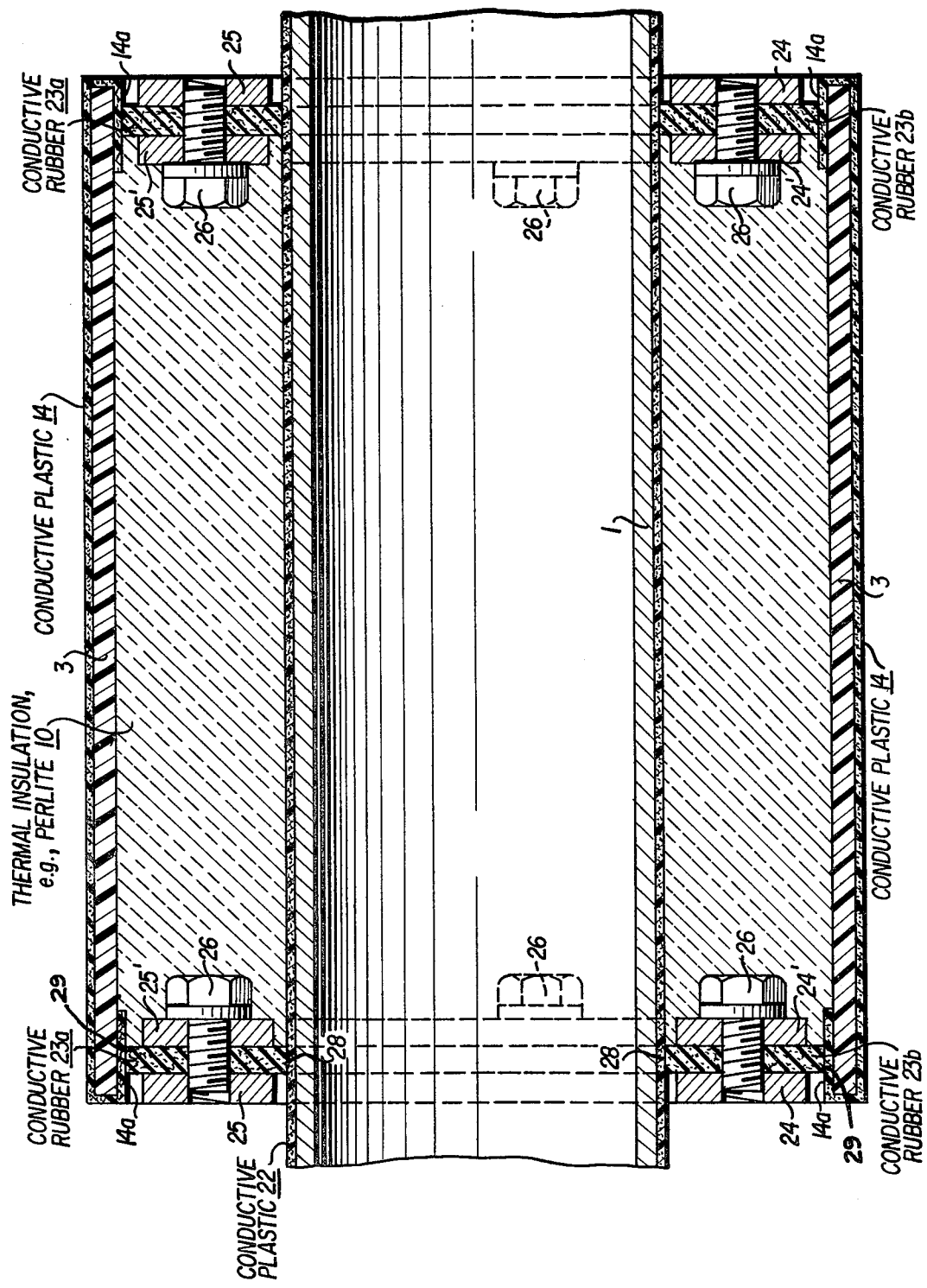
FIG. 4 shows a modification of the pipe according to the invention.

In a very convenient embodiment, the support flanges 5 and 5a are represented by a circular disc of a resilient, for instance, elastomeric material, e.g., conductive rubber. The ring is made of two ring parts 23a and 23b (FIG. 4).

On either side of these ring parts 23a and 23b, disc shaped parts 25, 25' and 24, 24' respectively, are positioned.

When completed, the separation line of circular parts 23a and 23b of the rubber material with respect to the line of the disc parts 24, 25 and 25', 24', respectively, is juxtaposed.

When the disc shaped parts 24, 24' and 25, 25' are moved towards each other by means of screw 26, rubber parts 23a, and 23b will be expanded inside and outside until their inner and outer rims 28 and 29 sealingly engage the outside of steel pipe 1 and the inside of plastic pipe 3, respectively.

In the above described way, an existing pipe line can be insulated very simply without the necessity of using welded flange parts or the like.

A very effective electrically conductive connection between the plastic outer pipe 3 and the metal inner pipe 1 is produced by having the surface layer 14a of thermosetting resin comprising soot particles extend to the inside of the plastic pipe 3 up to the ring 23a, 23b, which are made of resilient conducting rubber.

Should a plastic pipe instead of a metal pipe be used, this plastic inner pipe 1 will likewise be covered with a surface layer of electrically conducting material, for instance, a surface layer 22 which cooperates with the conducting ring, thus producing the desired conductive connection between pipe 1 and pipe 3.

When the surface layer 22 is grounded, the desired discharge of electric loads is thus obtained and, in particular, the discharge of electrostatic loads.

Obviously, other materials can be used for filling the intermediate zone between the inner and outer pipe.

The embodiment of FIG. 4 lends itself very well to provide existing metal pipes with flanges without a welding operation being necessary.

For furnishing a metal pipe 1 with such a plastic pipe 3, a welding operation was required which caused many problems, particularly in mining industries, since such an operation required a special protected area. In addition, a separate area was required for providing the pipe parts 1 with the required flanges.

The present invention permits the desired flanges to be made without welding any support flanges for spacing the outer plastic pipe parts 3 from the inner pipe 1. In this way, the flat disc parts 24, 24', 25, 25' and the half circular parts 23a and 23b of resilient material are used.

When moving the flat parts 24, 24', 25, 25' towards the circular parts 23a and 23b, the circular parts 23a and 23b of resilient material are pressed clampingly upon the surface of inner pipe 1, while a clamping and sealing cooperation with the inside of the outer plastic pipe 3 takes place.

This embodiment is also very suitable for providing fibre glass reinforced pipes with flanges.

What is claimed is:

1. A thermally insulated pipe, in particular a pipe for mining industries, comprising a plastic outer pipe and an inner pipe, the pipes being concentrically positioned with respect to each other, and a thermally insulating layer of heat resistant material between the inner and the outer pipe, said outer pipe having an electrically conductive outer surface layer which is electrically conductively connected with the inner pipe.

2. A pipe as claimed in claim 1, wherein the inner pipe is made of metal and includes metal support flanges spaced from the end zones of the pipe, said flanges cooperate conductingly with said electrically conductive surface layer on the outside of the plastic pipe, and said electrically conductive surface layer extends into the inside of the plastic pipe at least to the point where the flanges are positioned.

3. A pipe according to claim 1, wherein said inner pipe includes support flanges spaced from the end zones of the pipe, said electrically conductive surface layer extending to the inside of said plastic outer pipe at least up to the point at which the flanges are positioned and defining a conductive inner layer adjacent said end zones.

4. A pipe according to claim 3, wherein the support flanges and the conductive inner layer cooperate conductively and sealingly with the plastic outer pipe.

5. A pipe according to claim 3, wherein at least one of the support flanges includes a circumferential groove, a sealing ring of conductive material accommodated in said circumferential groove between the outer pipe and said one support flange.

6. A pipe according to claim 3, wherein the inner pipe is made of plastic and each support flange is made of a conductive elastomer and the outside surface of the inner pipe is provided with a conductive surface layer.

7. A pipe according to claim 3, wherein each support flange is provided with at least one closeable opening.

8. A pipe according to claim 7, wherein the inside of one of the flanges has a layer of filter material covering said at least one opening.

9. A pipe according to claim 8, wherein the layer of filter material is a fibrous layer, a woven layer or an asbestos layer.

10. A pipe according to claim 3, wherein at least one of the flanges comprises two flat parts which clampingly cooperate with a resilient circular ring, which ring clampingly cooperates with the inside of the outer pipe.

11. A pipe according to claim 10, wherein the circular ring constitutes a flat disc, the inside circumference of the disc clampingly cooperating with the outside of the inner pipe owing to the clamping cooperation of the flat parts.

12. A pipe according to claim 11, wherein the flat disc is constructed of circular segments, the separation lines of the circular segments being juxtaposed.

13. A pipe according to claim 1, wherein the insulating layer consists of thermally insulating filling particles covered with an electrically conductive layer.

14. A pipe according to claim 1, wherein the outer pipe constitutes shells which cooperate sealingly, the inside of the shells being provided with an insulating layer.

15. A pipe according to claim 1, wherein the conductive layer is a thermosetting resin with soot particles.

16. A pipe according to claim 1, further including an electrically conductive rubber ring positioned between the outer and inner pipes, said outer and inner pipes having inner and outer electrically conductive layers respectively arranged adjacent said ring, said ring extending from the electrically conductive inner layer on the outer pipe up to the electrically conductive outer layer of the inner pipe.

17. A pipe according to claim 1, wherein said electrically conductive layer comprises a resinous material admixed with electrically conductive particles.

* * * * *